United States Patent [19]

Furuta et al.

[11] 4,044,111

[45] Aug. 23, 1977

[54] METHOD OF TREATING CALCIUM NITRATE CONTAINED IN DENITRATION WASTE LIQUID

[75] Inventors: Isao Furuta, Mitaka; Hiroshi Tamura, Akashi; Masami Takao, Kobe, all of Japan

[73] Assignee: Kobe Steel, Limited, Kobe, Japan

[21] Appl. No.: 685,625

[22] Filed: May 12, 1976

[30] Foreign Application Priority Data

May 12, 1975 Japan .................................. 50-56253

[51] Int. Cl.$^2$ ............................................. C01B 21/00
[52] U.S. Cl. ..................... 423/351; 423/235; 423/390; 423/523; 423/386
[58] Field of Search ............... 423/386, 235, 504, 505, 423/523, 524, 351, 555

[56] References Cited

U.S. PATENT DOCUMENTS

| | | | |
|---|---|---|---|
| 1,912,833 | 6/1933 | Fairlie | 423/235 |
| 3,336,110 | 8/1967 | Ito et al. | 423/386 |
| 3,348,914 | 10/1967 | Quanquin et al. | 423/235 |
| 3,544,274 | 12/1970 | Van Dijk et al. | 423/386 |
| 3,932,585 | 1/1976 | Moriguchi et al. | 423/351 |
| Re. 16,709 | 8/1927 | Fairlie | 423/523 |

FOREIGN PATENT DOCUMENTS 10,604    1/1894    United Kingdom ................. 423/386

*Primary Examiner*—O. R. Vertiz
*Assistant Examiner*—Eugene T. Wheelock
*Attorney, Agent, or Firm*—Oblon, Fisher, Spivak, McClelland & Maier

[57] ABSTRACT

The present invention provides a method of converting $NO_3^-$ ions which are contained in denitration waste liquids to nonpoisonous $N_2$ gas or to valuable by-products. In the method of the invention, concentrated sulfuric acid is added to the waste liquid which results from denitration of exhaust gases which contains calcium nitrate and calcium chloride to obtain a mixed solution of nitric acid, hydrochloric acid, sulfuric acid and calcium sulfate. The ratio of the chloride ions to nitrate ions in the mixed solution is adjusted within the range of $Cl^-/NO_3^- = 2-3$; the mixed solution is heated to 110° to 150° C after adjusting the concentration of sulfuric acid in the solution to 10 to 70% by weight to thereby convert the mixed solution to a mixed gas essentially including NOCl, $Cl_2$ and nitrogen oxides. The mixed gas is then passed through concentrated sulfuric acid having a concentration higher than 80% which is maintained at a temperature of 80° to 150° C to obtain a nitrosylsulfuric acid solution. A mixed gas containing $SO_2$ and $H_2O$ is passed into the thusly formed nitrosylsulfuric acid solution to obtain a mixed gas containing NO, $NO_2$ and $SO_2$ which is then introduced into a reducing solution to convert the nitrogen oxides to $N_2$ gas.

8 Claims, 5 Drawing Figures

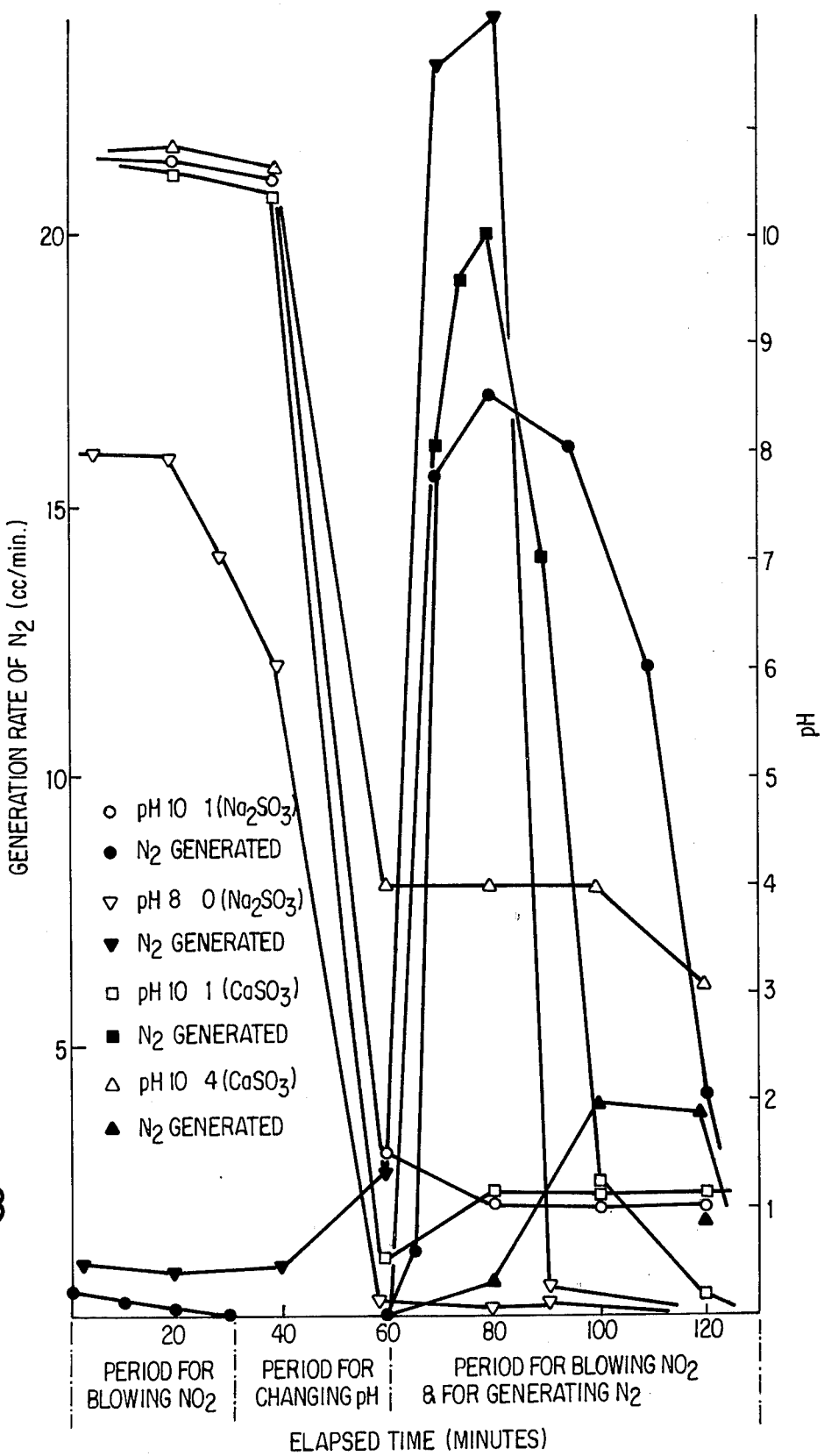

METHOD OF TREATING CALCIUM NITRATE CONTAINED IN DENITRATION WASTE LIQUID

BACKGROUND OF THE INVENTION

1. Field of the Invention

The present invention relates to a method of treating calcium nitrate formed by the process of contacting a gas containing nitrogen oxides with a calcium-containing absorption liquid to absorb and remove the nitrogen oxides.

When the nitrogen oxides contained in the exhaust gases are removed by absorption therefrom by the conventional wet denitration process, calcium nitrate is formed in the denitration waste liquid. However, no satisfactory method of disposing calcium nitrate solution has been developed and there remains the possibility that a novel pollution problem will arise if the thus formed calcium nitrate is disposed of in an improper manner.

2. Description of the Prior Art

In recent years, nitrogen oxides have drawn public attention because they cause air pollution problems as exemplified by the formation of photochemically derived oxidants. A number of dry and wet denitration methods for removing nitrogen oxides from exhaust gases have been proposed. In the conventional wet denitration method, the nitrogen oxides in the exhaust gases discharged from a boiler, incineration furnace, coke oven or the like are captured by absorbing and oxidizing them in an absorption liquid. However, treatment or disposal of the liquid which results from the denitration operation has not yet been sufficiently investigated and there are risks of causing new types of secondary or tertiary pollution problems if the wasteliquid is disposed of in an improper manner.

SUMMARY OF THE INVENTION

The present invention solves the aforementioned problems and has a primary object of providing a method of treating calcium nitrate-containing denitration waste liquids.

Another important object of the invention is to provide a method for treating calcium nitrate wherein the by-products produced in the intermediate steps of the process are of utilitarian value.

In order to attain the above objects, in the first embodiment of the present invention, concentrated sulfuric acid is added to a denitration waste liquid to obtain a mixed solution of nitric acid, hydrochloric acid, sulfuric acid and calcium sulfate. The ratio of chloride ions to nitrate ions is adjusted in the mixed solution within the range of $Cl^-/NO_3^- = 2-3$ (step A); the mixed solution is then heated to 110° to 150° C. after adjusting the sulfuric acid concentration of the solution to 10 to 70% by weight, preferably 60 to 67% by weight, thereby to convert the mixed solution to a mixed gas essentially including NOCl, $Cl_2$ and nitrogen oxides (step B). This mixed gas is then passed through concentrated sulfuric acid which has a concentration of 80% or more and is maintained at a temperature of 80° to 150° C. to form another mixed gas containing chlorine and hydrogen chloride gases and a solution of nitrosylsulfuric acid (step C). The mixed gas of $(SO_2 + H_2O)$ is passed into the nitrosylsulfuric acid formed in step C to obtain sulfuric acid and the mixed gas of $(NO + NO_2 + SO_2)$ which is then introduced into a reducing solution including one or more of the ions selected from the group consisting of $HCO_3^-$, $HSO_3^-$, and $SO_3^{--}$ thereby to convert to $N_2$ gas (step D).

The second embodiment of the present invention is characterized by the separation of solid calcium sulfate from the mixed solution in step A of the first embodiment.

The third embodiment of the present invention is characterized by the recycle of the sulfuric acid formed in step D of the first embodiment to steps B and C.

The fourth embodiment of the present invention is characterized by maintaining the pH value of the reducing solution used in step D of the first embodiment at 1-2.

The fifth embodiment of the present invention is characterized by initially maintaining the pH value of the reducing solution used in step D of the first embodiment at a value higher than 8 and thereafter the pH value is brought to less than 2 for proceeding to the conversion to $N_2$ gas.

The sixth embodiment of the present invention is characterized by introducing ($H_2O$ + air) gas into the nitrosylsulfuric acid formed in step D of the first embodiment to produce nitric acid.

BRIEF DESCRIPTION OF THE DRAWINGS

FIGS. 2 and 3 show the interrelation between the generation rate of $N_2$ gas and the pH value of the reducing solution.

DETAILED DESCRIPTION OF THE PREFERRED EMBODIMENT

In wet denitration, calcium hydroxide together with chlorine gas or calcium hypochlorite either singly or in combination with calcium chloride are used as an oxidizing absorbent for the nitrogen oxides contained in exhaust gases.

When the nitrogen oxides in the exhaust gas are oxidized by and absorbed in the denitration solution, nitrate ions accumulate in the solution and a denitration waste liquid containing calcium nitrate and calcium chloride, is therefore, discharged from the denitration process.

The object of the present invention is to treat this denitration waste liquid. The method of the present invention will be described hereinbelow with reference to a method of treating a denitration waste liquid containing a mixture of $CaCl_2 + Ca(NO_3)_2$.

First, sulfuric acid is added to the denitration waste liquid to form a mixed solution of nitric acid, hydrochloric acid, sulfuric acid and calcium sulfate and the solution is acidified. The reactions may be represented by the following reaction formulae:

$$CaCl_2 + H_2SO_4 \rightarrow CaSO_4 \downarrow + 2HCl$$

$$Ca(NO_3)_2 + H_2SO_4 \rightarrow CaSO_4 \downarrow + 2HNO_3$$

In the above step, hydrochloric acid or nitric acid may be added if necessary to adjust the ratio of chloride ions to nitrate ions such that the ratio is maintained in the range of $Cl^-/NO_3^-$ of 2 to 3 in order to promote the reaction by aqua regia which takes place in the next step.

The mixed solution is in slurry form since solid calcium sulfate is present therein, so that solid calcium sulfate is preferably isolated from the mixed solution by means of an appropriate separation method.

The concentration of $H_2SO_4$ is the mixed solution after separating the solid phase from the liquid phase is adjusted to 10 to 70% by weight, and the solution is then heated to 110° to 150° C. to be gasified. HCl and $HNO_3$ in the mixed solution interact with each other in accordance with the aqua regia reaction to form NOCl, $Cl_2$ and $H_2O$ as represented by the following reaction formula.

$$3HCl + HNO_3 \xrightarrow[H_2SO_4]{Gasification} NOCl + Cl_2 + 2H_2O$$

Figure 1:
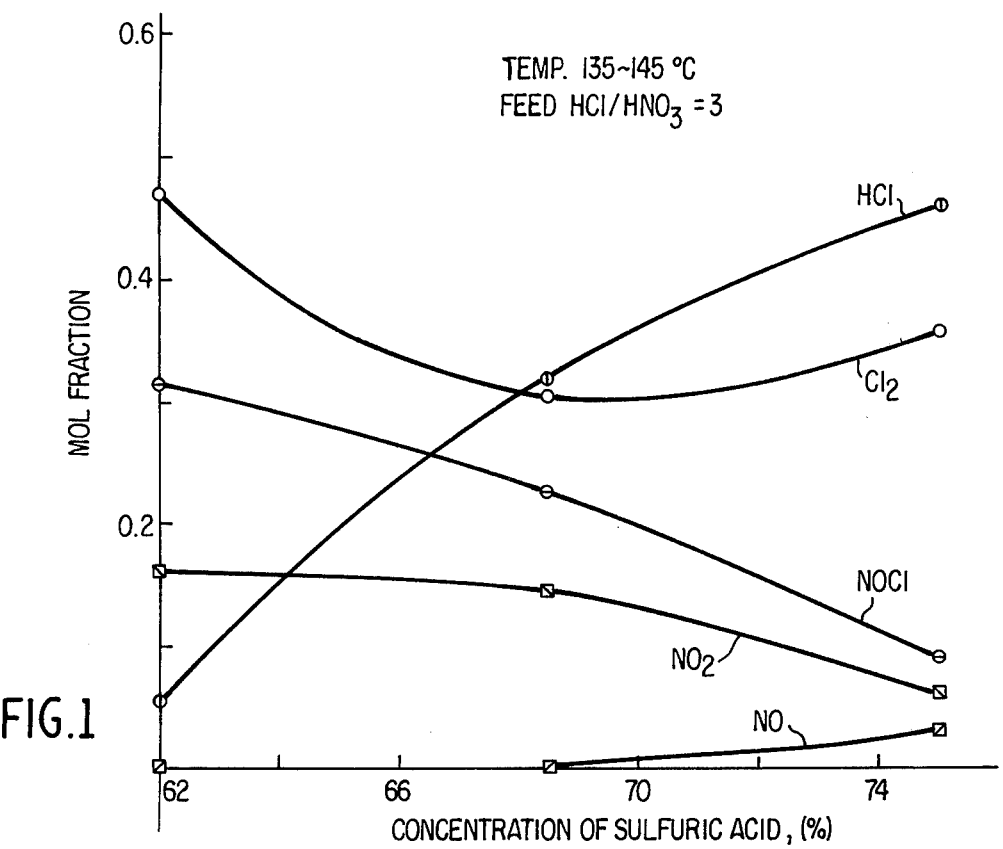
FIG. 1 shows the relationship between the sulfuric acid concentration and the composition of the gas generated by the gasification reaction.

Components of the gas actually generated by the gasification reaction include unreacted HCl and $HNO_3$ and $NO_x$ which is formed by decomposition of a portion of the NOCl, and hence the actually obtained gas consists of NOCl, $Cl_2$, $H_2O$, HCl, $HNO_3$, and $NO_x$. The interrelation between the concentration of $H_2SO_4$ and the composition of the generated gas in this gasification step is shown in FIG. 1. It is preferred to maintain the concentration of sulfuric acid in the range of 60-67% by weight, in order to obtain greater amounts of NOCl which is advantageous.

The generated gas is passed through a solution of $H_2SO_4$ containing 50 to 75% by weight of sulfuric acid for refining.

$$\begin{bmatrix} NOCl \\ Cl_2 \\ H_2O \\ HCl \\ HNO_3 \\ NO_x \end{bmatrix} \xrightarrow[H_2SO_4]{Refining} \begin{bmatrix} NOCl \\ Cl_2 \\ NO_x \end{bmatrix}$$

The refined gas is then passed through concentrated sulfuric acid maintained at a concentration higher than 80% and at a temperature in the range of 80° to 150° C. to obtain nitrosylsulfuric acid. In this step (NOCl + $NO_x$) may be selectively absorbed in the concentrated sulfuric acid from the mixed gas of ($Cl_2$ + NOCl + $NO_x$), since $Cl_2$ is not absorbed by conc. sulfuric acid. Reactions of NOCl and $NO_x$ with conc. sulfuric acid proceed in the manner as represented by the reaction formulae shown below, and as a result a mixed gas of ($Cl_2$ + HCl) and a solution of $NOHSO_4$ are obtained. The obtained mixed gas of ($Cl_2$ + HCl) is used in the denitration process as an oxidizing agent for $NO_x$.

$$\begin{bmatrix} Cl_2 \\ NOCl \\ NO_x \end{bmatrix} \xrightarrow[80° - 150°C.]{H_2SO_4} \begin{bmatrix} Cl_2 \rightarrow Cl_2 \\ NOCl \rightarrow NOHSO_4 + HCl \\ NO_x(NO + NO_2) \rightarrow \\ 2NOHSO_4 + H_2O \end{bmatrix}$$

($SO_2 + H_2O$) gas is then passed into the solution of $NOHSO_4$ for regeneration to form a mixed gas of $[NO_x(=NO + NO_2) + SO_2]$ and sulfuric acid.

$$2NO.HSO_4 + H_2O \rightleftharpoons NO + NO_2 + 2H_2SO_4$$

$$2NO.HSO_4 + 2H_2O + SO_2 \rightleftharpoons 2NO + 3H_2SO_4$$

The sulfuric acid obtained is circulated to be used as the absorbing agent for selectively absorbing (NOCl + $NO_x$) from the generated gas to form nitrosylsulfuric acid. $NO_3^-$ ions are stable and they are only converted to $N_2O$ and NO if they are directly reduced, and are difficult to convert to $N_2$. Accordingly, in the method of the invention $NO_3^-$ ions are converted to the forms of nitrogen oxides which may be converted to $N_2$. The above mentioned mixed gas of (NO + $NO_2$ + $SO_2$) is introduced into a reducing solution, where $NO_2$ is absorbed in the solution and reduced by the reducing groups in the solution to $N_2$ gas. Examples of the reducing solutions are those containing one or more of $HCO_3^-$, $HSO_3^-$, and $SO_3^{--}$. The pH value of the reducing solution may be maintained on the acidic side or may be initially maintained on the alkali side and then changed to the acidic side.

Figure 2:
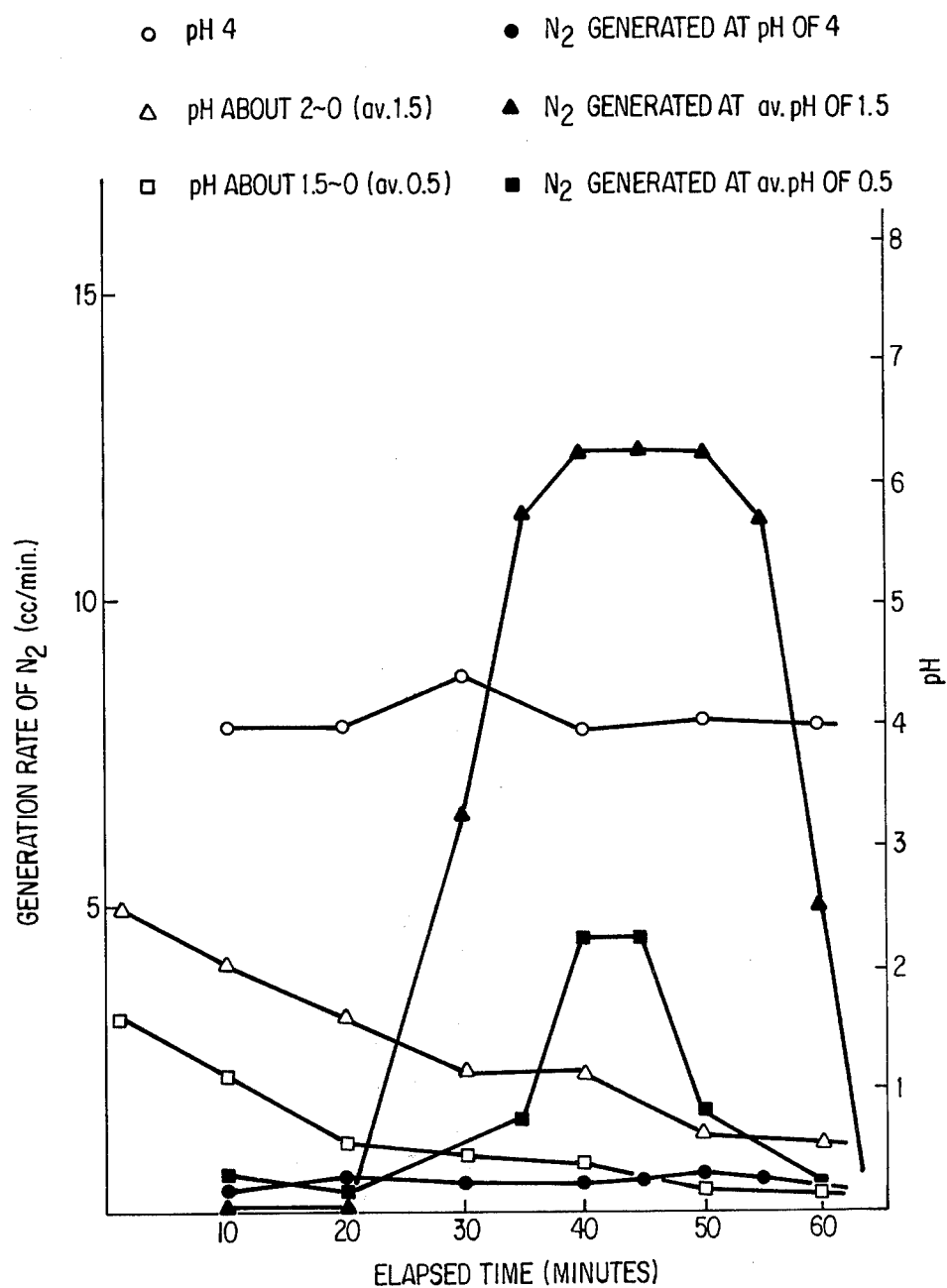
Figure 5:
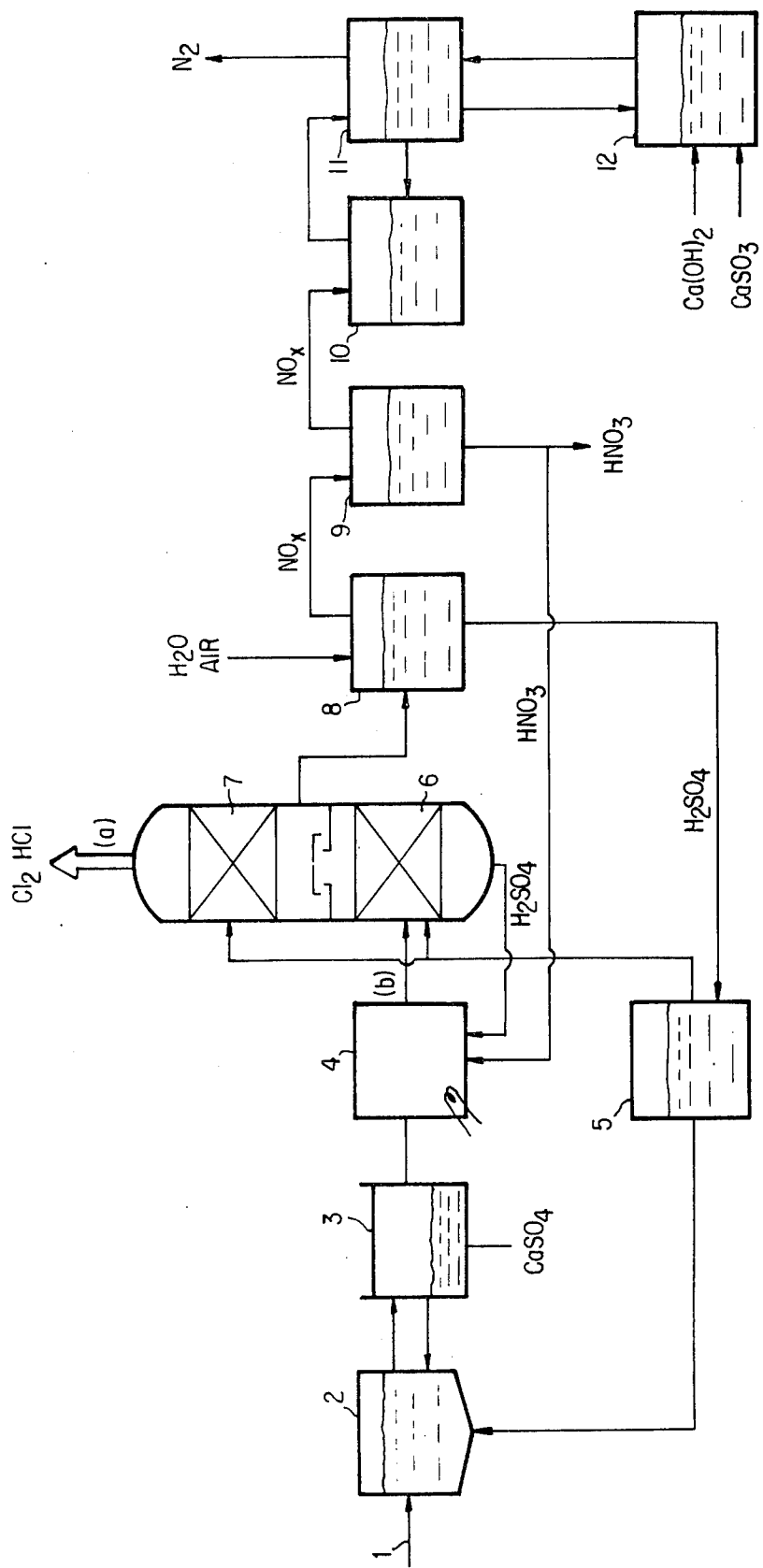

Experiments have been conducted wherein 20% solutions of $Na_2SO_3$ are used as the reducing solutions and the pH values of the solutions are maintained, respectively, at 4 (average), in the range of about 2 to about 0 (average : 1.5) and in the range of about 1:5 to about 0 (average: 0.5). In the experiments, gases containing 10% of $NO_2$ are introduced into the solutions and changes in rates of the generated $N_2$ gas in terms of time are measured, the results of which are shown in FIG. 2 and Table 1. As is readily understood therefrom, the pH value of the solution is preferably maintained in a range of 1 to 2, when $NO_x$ is converted to $N_2$ using a reducing solution maintained on the acidic side.

Table 1

| Solution: 20 % solution of $Na_2SO_3$ | | | |
|---|---|---|---|
| pH value | 4 | 1.5 (average) | 0.5 (average) |
| Theoretical amount of $N_2$ (cc) Generated | 900 | 900 | 900 |
| $N_2$ (cc) | 23 | 338 | 51 |
| Degree of conversion (%) | 2.5 | 37.6 | 5.7 |

FIG. 3 shows changes in rates of the generated $N_2$ gas in terms of time when gases containing 10% of $NO_2$ are introduced into a 20% solution of $Na_2SO_3$ and a 20% solution of $CaSO_3$, both of which are initially adjusted to have pH values of higher than 10, for 30 minutes, and then the pH values of the solutions are changed to 4 and 1 respectively and then the same $NO_2$ gases are continued to be introduced thereinto. FIG. 3 also shows changes in rates of the generated $N_2$ gas in terms of time when the same $NO_2$ gas is continuously introduced into a 20% solution of $Na_2SO_3$ which is initially adjusted to have the pH value of 8. The results of the above experiments are also shown in Table 2. As will be understood from the results of these experiments, it is preferred to maintain the pH value of the reducing solution higher than 8 during the initial reaction period and then changed to lower than 2, if the pH value of the solution is changed during the reaction period.

Table 2

|  | Solution: 20% solution of Na₂SO₃ | | Solution: 20% solution of CaSO₃ | |
|---|---|---|---|---|
| Change in ph value | higher than 10 ↓ 1 | 8 ↓ 0 | higher than 10 ↓ 1 | higher than 10 ↓ 4 |
| Theoretical amount of N₂*⁽ᶜᶜ⁾ | 1350 | 1350 | 1350 | 1350 |
| Generated N₂⁽ᶜᶜ⁾ | 725 | 649 | 515 | 84 |
| Degree of conversion (%) | 53.7 | 48.1 | 38.1 | 6.2 |

*Note: Theoretical amounts of N₂ means the generated amount or rate of N₂ on the assumption that all of the introduced NO$_x$ is converted to N₂. SO₂ contained in the mixed gas of (NO + NO₂ + SO₂) which is introduced into a reducing solution is used as a reducing agent for the NO₂ gas.

In the foregoing description, the method of treating $NO_3^-$ ions in a denitration waste liquids for converting them to nonpoisonous N₂ gas has been described. However, instead of converting them to N₂ gas, nitric acid may be formed by introducing (H₂O + air) into the nitrosylsulfuric acid obtained in the step preceding to the conversion step to the N₂ gas, if such is desired. The reaction for forming nitric acid is represented by the following formula:

$$NO.HSO_4 + H_2O + air \rightarrow HNO_3$$

The present invention will be described in more detail reference to the Example thereof.

EXAMPLE 1

Figure 4:
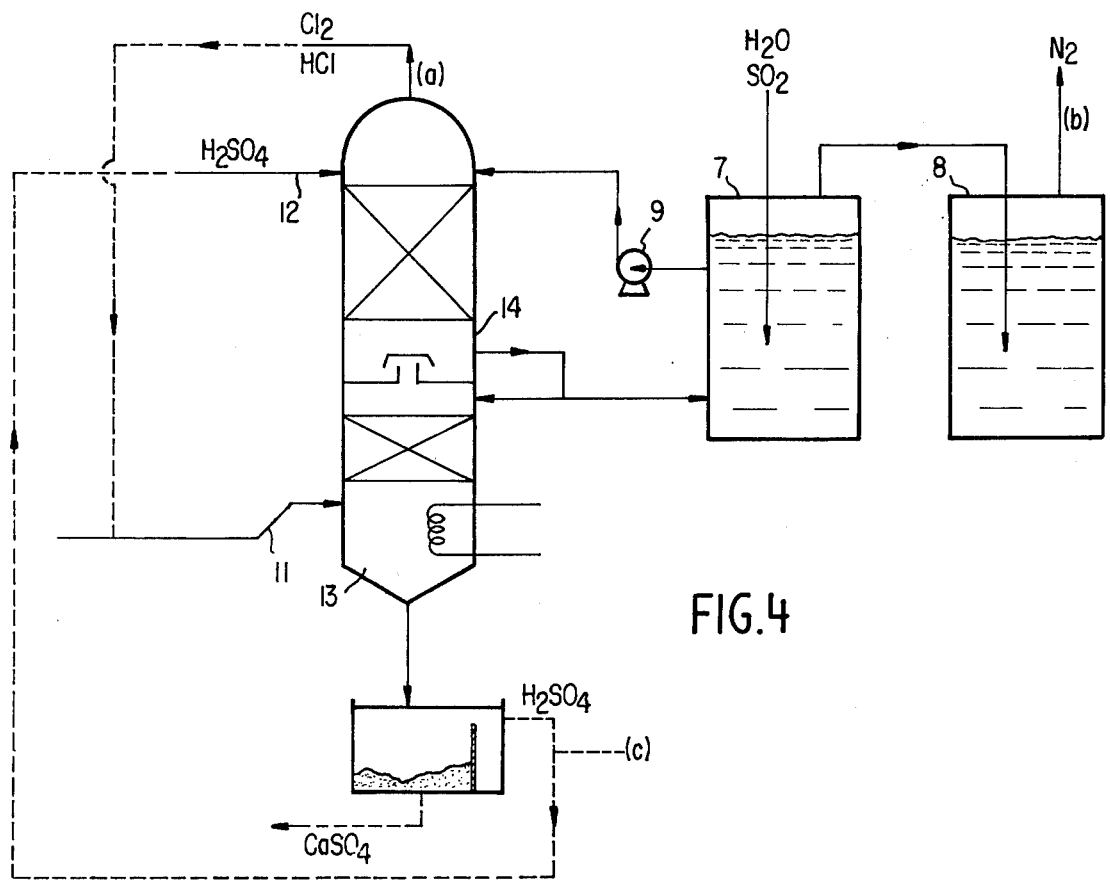
FIGS. 4 and 5 are flow charts each showing diagrammatically one embodiment of the device used for practicing the method of the present invention, wherein reference numberals 1 and 2 designate resevoirs, numeral 3 designates a mixing tank, numeral 4 designates a heated reaction vessel, numeral 5 designates a condenser, numerals 6 and 7 designate bubbling mixer vessels, numeral 8 designates a vessel containing reducing solution, numeral 9 designates a pump, numeral 11 designates a feeding line through which a solution to be treated is fed, numeral 12 designates a feeding line through which $H_2SO_4$ is fed, numeral 13 designates a reaction vessel and numeral 14 designates an absorption tower.

Referring to the flow chart shown in FIG. 4, a mixed solution containing 20% of CaCl₂ and 10% of Ca(NO₃)₂, which is the liquid to be treated, is fed through the feeding line 11 at a flow rate of 12 ml/min into reaction vessel 13 (volume: 0.5l), and the flow rate of 75% solution of H₂SO₄ flowing down from the upper portion of the reaction vessel 13 to the lower portion thereof is adjusted at 18 ml/min and allowed to mix with the liquid to be treated, thereby allowing to proceed nitric acid forming reaction, hydrochloric acid forming reaction and other accompanying reactions. The vessel is heated to maintain the reaction temperature in the range of 100° to 120° C. The reaction formulae are as follows:

$$CaCl_2 + H_2SO_4 \rightarrow CaSO_4 + 2HCl$$

$$Ca(NO_3)_2 + H_2SO_4 \rightarrow CaSO_4 + 2HNO_3$$

(I) $3HCl + HNO_3 \rightarrow NOCl + Cl_2 + 2H_2O$ $$HCl + HNO_3 \text{ (in liquid)} \rightleftarrows HCl + HNO_3 \text{ (in gas)}$$

H₂SO₄ contained in the liquid drained off from the lower portion of the reaction vessel 13 is concentrated to 98% conc. sulfuric acid and recirculated through the feeding line 12 into the reaction vessel 13. The gas generated in the reaction vessel 13 and containing HCl, HNO₃, H₂O, NOCl, Cl₂, NO and NO₂ flows upwardly through the absorption tower 14 in which 80% solution of H₂SO₄ is used as an absorption liquid, whereby all component gases other than Cl₂ are reacted with sulfuric acid or absorbed thereby and removed. The absorption tower 14 is a packed tower for allowing to effect counter current operations and has the dimensions of 50 mm in diameter and 250 mm in height. In the lower portion of the absorption tower HCl, HNO₃ and H₂O which are generated in the reaction vessel 13 are absorbed and concurrently a considerable amount of $NO_3^-$ is decomposed in accordance with the decomposition reaction represented by the reaction formula (I) set forth above, to from NOCl and Cl₂. In the upper portion of the tower NOCl and NO$_x$ (= NO and NO₂) are absorbed. Related reaction formulae are set forth hereinbelow.

$$2NOCl + HNO_3 + H_2SO_4 \rightarrow Cl_2 + 2H_2O + 3NO.HSO_4$$

$$NOCl + H_2SO_4 \rightleftarrows HCl + NO.HSO_4$$

$$NO + NO_2 + 2H_2SO_4 \rightleftarrows H_2O + 2NO.HSO_4$$

The solution of NO.HSO₄ formed in the absorption tower 14 is recirculated between the absorption tower 14 and the bubbling mixer vessel 7 (volume: 2 l) and if a gas of (H₂O + SO₂) is introduced into the bubbling mixer vessel 7 at a flow rate of 70 l/min, NO$_x$ is discharged by the reaction with SO₂ + H₂O.

The concentration of the solution of NO.HSO₄ was adjusted to contain NOHSO₄ in liquid in a range of 0.1 to 0.5 mol/l by the use of the recirculation pump 9. And the temperature of the solution was maintained at 75° to 85° C. The concentration of H₂SO₄ was found to be 80% in the recirculating portion and to be 40% in the drained off liquid. Reaction formulae in this connection are:

$$2NO.HSO_4 + H_2O \rightleftarrows NO + NO_2 + 2H_2SO_4$$

$$2NO.HSO_4 + 2H_2O + SO_2 \rightleftarrows 2NO + 3H_2SO_4$$

NO$_x$ were converted to N₂ by introducing SO₂ and NO$_x$ (= NO + NO₂) which had passed through the bubbling mixer vessel 7 into the vessel containing alkali solution. The used alkali absorption liquid was 10% solution of NaHCO₃ and the solution was maintained at 60° C. Reaction taking place in the absorption vessel is as follows.

$$NO + NO_2 + 3SO_2 \xrightarrow{OH^-} N_2 + 3HSO_4^-$$

RESULT OF THE EXPERIMENT

Result of the analysis of the example solution picked up from the feeding line 11 is shown in Table 3.

Table 3

| Material | Concentration |
|---|---|
| Cl⁻ | 4.0 gram ion/l |
| NO₃⁻ | 1.6 gram ion/l |

Result of the analysis of the filtered solution picked up at (c) in the Figure is shown in Table 4.

Table 4

| Material | Concentration |
|---|---|
| Cl⁻ | 0.21 gram ion/l |
| NO₃⁻ | 0.13 gram ion/l |
| H₂SO₄ | 5.4 mol/l |
| Materials reacting in iodometry | 5.2 × 10⁻⁴ gram equivalent/l |

Table 5

| Sampling position | Objective material of the analysis | Result of the analysis (per cent) |
|---|---|---|
| (a) | $Cl_2$ | 82% |
| (a) | $NOCl + NO_x$ | 1.2% |
| (b) | $N_2$ | 86% |
| (b) | $O_2$ | 2% |

The efficiency of the treatment $NO_3^-$ will be calculated from the results of the analyses listed aboved. Gram ion numbers of $NO_3^-$ present prior to the reaction were:

1.6 gram ion/l × 0.12 l/min = 0.019 gram ion/min.
Gram ion numbers of $NO_3^-$ remained after the reaction were:

0.13 gram ion/l × 0.025* l/min × 0.0035 gram ion/min (Value marked by * means the analytical value.)
Gram ion numbers of $NO_3^-$ which adhered and removed with $CaSO_4$ were:

4.65 gram/min × 0.50* × $\frac{0.13 \text{ gram ion/l}}{1000}$
= 3.0 × 10$^{-4}$ gram ion/l
(: amount of formed $CaSO_4$; *: $CaSO_4$ content in the liquid.)

Hence, the efficiency of the treatment was the quotient of (Gram ion numbers present prior to the reaction) — (Gram ion numbers remained after the reaction) — (Gram ion numbers removed with $CaSO_4$) divided by (Gram ion numbers present prior to the reaction) and was calculated as follows:

$$\frac{0.019 - 0.0035 - 0.003}{0.019} = 0.80 \ (80\%)$$

According to the present invention, $NO_3^-$ ions contained in denitration waste liquids which was not treated in the conventional method are converted to nonpoisonous $N_2$ gas. Consequently, secondary or tertiary pollution problems due to water pollution caused by wasted liquids can be advantageously prevented. Besides, $Cl^-$ ions present in denitration waste liquids concurrently with $NO_3^-$ ions are converted to form $Cl_2$ as one of the by-products, so that derivatives of $Cl_2$ such as $ClO_2^-$, $ClO_3^-$ and $HOCl$ may be produced with ease. In practicing the method of the present invention, apparatus for preparing and feeding oxidizing absorbent for $NO_x$, which apparatus have been considered as indispensable elements for the conventional wet denitration process, may be excluded. Namely, in the process of the present invention oxidizing absorbents of Cl system are used for oxidizing and absorbing $NO_x$, so that an associated system of Cl – $Cl_2$ is used as a recycle group. As a result, the whole system of denitration process may be operated in a form of closed system. Furthermore, the denitration system can be installed more simply and in more economical manner with the use of the present invention.

What is claimed is:

1. A method of treating a denitration waste liquid comprising calcium chloride and calcium nitrate which comprises the steps of:

A. adding concentrated sulfuric acid to said denitration waste liquid to obtain a mixed solution including nitric acid, hydrochloric acid, sulfuric acid and calcium sulfate and adjusting the ratio of chloride ions to nitrate ions in said mixed solution within the range of $Cl^-/NO_3^- = 2 - 3$;

B. Adjusting the sulfuric acid concentration in said solution to from 10 to 70 wt.%.

C. heating said mixed solution to 110° to 150° C to generate a mixed gas comprising NOCl, $Cl_2$ nitrogen oxides, HCl, $CL_2$ and $HNO_3$;

D. passing said mixed gas through a concentrated sulfuric acid which has a concentration of higher than 80% and is maintained at a temperature of 80° to 150° C. to obtain a mixed gas containing chlorine and hydrogen chloride and a nitrosylsulfuric acid solution;

E. introducing a mixed gas of ($SO_2 + H_2O$) into said nitrosylsulfuric acid to form sulfuric acid and a mixed gas of ($NO + NO_2 + SO_2$) and thereafter introducing the latter mentioned mixed gas into a reducing solution to convert nitrogen oxides to $N_2$ gas.

2. The method as claimed in claim 1, wherein calcium sulfate is separated from said mixed solution obtained in Step A.

3. The method as claimed in claim 1, wherein sulfuric acid formed in step E is recirculated and added to said mixed solution in step C.

4. The method as claimed in claim 1, wherein the concentration of sulfuric acid used in is adjusted to 60 to 67% by weight in step B.

5. The method as claimed in claim 1, wherein the reducing solution of step E contains one or more of the ions selected from the group consisting of $HCO_3^-$, $HSO_3^-$ and $SO_3^-$.

6. The method as claim in claim 1, wherein the pH value of the reducing solution is maintained at 1 to 2.

7. The method as claimed in claim 1, wherein the pH value of the reducing solution is adjusted initially higher than 8 and then changed to lower 2 for allowing to generate $N_2$ gas.

8. A method of treating a denitration waster liquid comprising calcium chloride and calcium nitrate which comprises the steps of:

A. adding concentrated sulfuric acid to said denitration waste liquid to obtain a mixed solution including nitric acid, hydrochloride acid, sulfuric acid and calcium sulfate and adjusting the ratio of chloride ions to nitrate ions in said mixed solution within the range of $Cl^-/NO_3^- = 2-3$;

B. adjusting the sulfuric acid concentration in said solution to from 10 to 70 wt.%;

C. heating said mixed solution to 110° to 150° C to generate a mixed gas comprising NOCl, $Cl_2$, nitrogen oxides, HCl, $Cl_2$ and $HNO_3$;

D. passing said mixed gas through a concentrated sulfuric acid which has a concentration of higher than 80% and is maintained at a temperature of 80° to 150° C to obtain a mixed gas containing chlorine and hydrogen chloride and a nitrosylsulfuric acid solution;

E. introducing water and air into said nitrosylsulfuric acid to form nitric acid.

* * * * *